May 1, 1945. R. M. PARKE ET AL 2,375,033
HARDNESS TESTING APPARATUS
Filed May 5, 1943
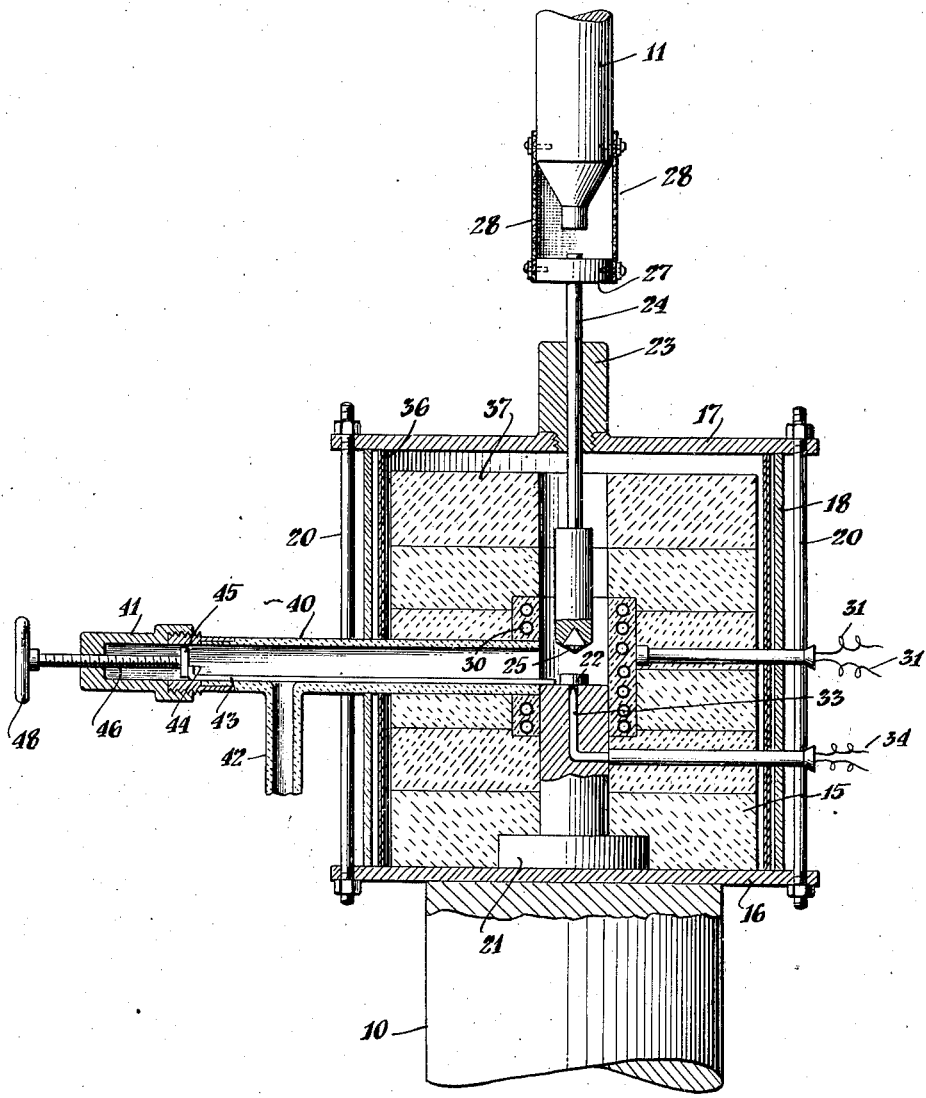

Patented May 1, 1945

2,375,033

UNITED STATES PATENT OFFICE 2,375,033

HARDNESS TESTING APPARATUS

Robert M. Parke and Frederick P. Bens, Detroit, Mich., assignors to Climax Molybdenum Company, New York, N. Y., a corporation of Delaware Application May 5, 1943, Serial No. 485,712

4 Claims. (Cl. 73—81)

The present invention relates to testing apparatus and more particularly to hardness testing apparatus for use at elevated temperatures.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompany drawing, referred to herein and constituting a part hereof, illustrates the present preferred embodiment of the invention, and together with the description, serves to explain the principles of the invention.

The single figure of the drawing is a vertical section showing a typical and illustrative embodiment of the present invention.

The present invention has for its object the provision of a novel and improved hardness testing apparatus particularly adapted for performing hardness tests at elevated temperatures. A further object of the invention is the provision of an accurate, convenient and easily operated apparatus by which the Vickers hardness of a sample may be determined at relatively high temperatures. Still another object of the invention is the provision of a hot hardness testing apparatus which preserves the sample and indenting tool against deterioration while the sample is being tested.

In accordance with the present invention there is provided an anvil for supporting the sample to be tested and the anvil is surrounded by a relatively strong chamber which can be rendered air-tight and subjected to a high degree of vacuum. Above the anvil and mounted for axial movement within the chamber is a piston at the lower end of which is mounted the indenting tool which may comprise the usual diamond indenter or penetrator, so located as to be movable into and out of contact with the sample supported on the anvil. The piston is preferably mounted for free movement in a tightly fitted sleeve, and the piston and sleeve are both preferably made of some material having a negligible temperature coefficient of expansion so that the fit remains substantially unchanged over a wide temperature range. The piston is flexibly connected to the usual Vickers loading piston so that the piston may be loaded in the usual manner and may be easily retracted out of contact with the specimen.

Surrounding the anvil and the specimen are provided heating means by which the anvil, specimen and indenting tool are brought to the desired temperature, and a thermocouple is preferably mounted on the anvil at the specimen and leads to a registering instrument externally of the chamber so that the temperature of the specimen may be accurately determined. Between the specimen and the wall of the chamber is provided refractory and insulating material so as to keep the exterior of the apparatus as cool as possible and to minimize the heat loss from the heating element.

The chamber and insulating and refractory elements are apertured and provided with means by which the specimen to be tested may be inserted into and removed from the chamber and accurately positioned on the anvil, and this same aperture may conveniently serve for the connection to the vacuum pump or other means by which the interior of the chamber is exhausted. The exhaustion of the chamber not only prevents corrosion of the specimen at high temperatures, but also prevents deterioration of the diamond when it and the specimen are subjected to temperatures in the neighborhood of 1500° F. Preferably the apparatus is constructed with separable top and bottom portions and the refractory material is made in several sections so that the apparatus may be easily disassembled for replacement of the heating element or other repairs.

It will be understood that the foregoing general description and the following detailed description as well are exemplary and explanatory of the invention but are not restrictive thereof.

Referring now in detail to the present preferred and illustrative embodiment of the invention as shown in the accompanying drawing, the invention is shown as adapted for use with a conventional form of Vickers hardness testing apparatus having a stage or foundation member 10 and a loading piston 11 which may be raised and lowered with reference to the stage and may be accurately controlled so as to exert a predetermined pressure toward the stage. On the upper surface of the stage 10 is mounted the chamber 15 which comprises a bottom plate 16, a top plate 17 and a cylindrical wall portion 18, the top and bottom plates and the cylindrical wall preferably being made of steel of substantial thickness. These parts are held together by means of the tie bolts 20 passing through suitable apertures in the top and bottom plates 16 and 17, a sufficient number of the tie bolts being provided to firmly hold the plates against the top and bottom edges of the cylindrical wall 18. The plates 16 and 17 are surface ground on both sides and are accurately fitted to the top and bottom edges of the cylinder 18 so as to be parallel with each other and at the same time provide air-tight joints.

An anvil 21 is supported on the upper surface of the bottom plate 16, and is provided with a flat upper surface to receive the specimen 22. This anvil is preferably made of some material which is relatively corrosion resistant such as stainless steel, and its upper surface is substantially parallel to the surfaces of the plates 16 and 17. In the upper plate 17 is threaded a sleeve 23 within which slides a piston 24 carrying at its lower end the diamond indenting tool 25. The piston is preferably coaxial with the anvil 21, and when lowered will press its diamond 25 into a specimen centered on the anvil. The piston 24 and sleeve 23 are preferably formed of material having a negligible coefficient of expansion such as invar, and the piston is closely fitted within the sleeve so that while it may move freely axially thereof and there is no substantial drag on its movement, the joint between the piston and the sleeve is substantially air-tight even at a relatively high vacuum.

The piston 24 is preferably connected to the loading piston 11 by means of a flexible suspension and, as illustrated, the upper end of the piston 24 is provided with a bar 27. Flexible members 28, such as canvas straps, are secured to the bar 27 and the lower end of the piston 11, thereby providing for retraction of the piston, at the same time permitting the lower end of the piston 11 to be spaced from the upper end of the piston 24.

Heating means are provided surrounding the anvil, specimen and indenting tool and as illustratively embodied comprise the heating coil 30 of generally cylindrical shape which is supplied with power through the sealed furnace leads 31. A thermocouple 33 is mounted at the upper surface of the anvil 21, preferably in contact with, or close to, the specimen 22, and its leads 34 are likewise sealed in the chamber wall 18 so as to prevent air leakage.

Heat insulation is provided between the heating coil 30 and the cylindrical wall member 18 and may comprise the aluminium foil cylindrical radiation shield 36 composed of several layers of spaced apart aluminium foil, and the refractory bricks 37 which substantially fill the space between the anvil heating coil and the radiation shield 36.

Means are provided for introducing a specimen into and withdrawing it from the chamber and for accurately positioning it on the anvil 21. For this purpose the chamber wall 18, radiation shield 36, refractory material 37 and heating coil 30 are apertured to receive a refractory tube 40 which extends from outside the casing to the anvil, and is positioned substantially at the level of the upper surface of the anvil and is also sealed to the wall 18 so as to provide an air-tight joint. On the outer end of the tube 40 is threaded an air-tight cap 41, and a T 42 is provided to which the vacuum pump connection may be made. Within the horizontally extending tube 40 is a pusher rod 43 of refractory material having an upturned outer end 44 to contact with a disk 45 carried by the screw rod 46 threaded in the cap 41. The outer end of the screw rod 46 is provided with a hand wheel 48, and in use the inner end of the pusher rod 43 lies against the specimen 22 so that the specimen 22 may be accurately moved across the face of the anvil by manipulation of the hand wheel 48 and without breaking the vacuum within the apparatus.

In using the apparatus, the cap 41 is unscrewed and the specimen 22 is introduced into the refractory tube 40 and is pushed onto the anvil 21 by manipulation of the pusher rod 43. The cap 41 is then replaced and the entire chamber is exhausted until the pressure has been reduced to the desired value which is preferably about 75 microns (mercury gage). The power is then turned on supplying current to the heating coil 30, and the power is adjusted to produce the desired temperature which is determined by the thermocouple 33. After the temperature has reached equilibrium, the stage 10 is raised until the diamond is resting on the surface of the specimen leaving only a slight clearance between the pistons 24 and 11.

The Vickers machine is then set in operation to lower the piston 11 slowly into contact with the piston 24 so as to exert the desired load on the diamond indenter 25 as it rests against the specimen 22. After a few seconds the load is released, the stage is lowered to raise the diamond off the specimen and the hand wheel 48 is moved to push the specimen 22 into position for another test. With the specimen re-positioned, the operation may be repeated after which the power supply to the heating coil 30 is discontinued and the furnace is allowed to cool down to approximately room temperature.

When sufficiently cool, air may be admitted to the chamber and the specimen removed through the refractory tube 40 and the Vickers pyramid number of the specimen determined in the usual manner.

It has been determined by actual test that the error introduced into the readings by making the readings at room temperature is less than the normal error of the conventional Vickers apparatus, and this error can be easily disregarded.

The apparatus as a whole can be removed from the conventional Vickers hardness testing machine so that the remainder of the apparatus may be used in the conventional manner.

The invention in its broader aspects is not limited to the specific parts and combinations shown and described but departures may be made therefrom within the scope of the accompanying claims without departing from the principles of the invention and without sacrificing its chief advantages.

What we claim is:

1. A hardness testing machine for use at relatively high temperatures including in combination a chamber, an anvil within the chamber for supporting the specimen, means for heating the specimen on the anvil, heat insulation between the specimen and the chamber wall, an axially movable piston above the anvil, and an indenting tool carried by the piston to contact with the specimen, said chamber being provided in line with the anvil with an opening, an elongated bearing and guide sleeve closing the opening and having a longitudinal bore for passage of the axially movable piston, said sleeve extending a substantial distance beyond its point of connection with the chamber to accurately guide and stably support the piston against lateral deflection, the piston and wall of the bore in the sleeve having a substantially air-tight fit and the piston and sleeve being formed of material having an extremely small coefficient of thermal expansion and a vacuum pump connection to the chamber for evacuating the chamber.

2. A hardness testing machine for use at relatively high temperatures including in combination a chamber having a cylindrical wall portion and tightly fitted top and bottom ends, an anvil supported on the bottom end for receiving a specimen, a resistance heater surrounding the anvil and specimen, heat insulation between the heater and chamber wall and ends, a piston above the anvil carrying an indenting tool to indent the specimen and a sleeve in the upper end and in which the piston is axially movable and tightly fitted, a vacuum pump connection to the chamber for evacuating the chamber.

3. A hardness testing machine for use at relatively high temperatures including in combination a chamber having a cylindrical wall portion and tightly fitted top and bottom ends, an anvil supported on the bottom end for receiving a specimen, a resistance heater surrounding the anvil and specimen, heat insulation between the heater and chamber wall and ends, a piston above the anvil carrying an indenting tool to indent the specimen and a sleeve in the upper end and in which the piston is axially movable and tightly fitted, said chamber and insulation having an aperture to permit the specimen to be inserted onto and removed from the anvil, a closure for said aperture, means for exhausting air from the chamber through said aperture, a device disposed in the chamber for shifting the specimen on the anvil, and means extending through the closure for operating said device.

4. A hardness testing machine for use at relatively high temperatures including in combination a chamber having a cylindrical wall portion and tightly fitted top and bottom ends, an anvil supported on the bottom end for receiving a specimen, a resistance heater surrounding the anvil and specimen, heat insulation between the heater and chamber wall and ends, a piston above the anvil carrying an indenting tool to indent the specimen and a sleeve in the upper end and in which the piston is axially movable and tightly fitted, said chamber and insulation being apertured to permit the specimen to be inserted onto and removed from the anvil, said piston and sleeve being formed of metal having an extremely small coefficient of thermal expansion and means for exhausting the chamber through said aperture.

ROBERT M. PARKE.
FREDERICK P. BENS.